UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

SAFRANIN AZO NAPHTHOL LAKE.

SPECIFICATION forming part of Letters Patent No. 524,254, dated August 7, 1894.

Application filed April 1, 1893. Serial No. 468,691. (Specimens.) Patented in England March 13, 1891, No. 4,543; in Germany March 20, 1891, No. 61,692; in France March 23, 1891, No. 212,276; in Belgium July 31, 1891, No. 95,698; in Spain August 20, 1891, No. 12,328; in Italy September 30, 1891, XXIV, 30,135, LIX, 128, and in Austria-Hungary December 3, 1891, No. 41/3,714 and No. 25/3,637.

*To all whom it may concern:*

Be it known that I, PAUL JULIUS, a subject of the Emperor of Austria-Hungary, residing at Ludwigshafen-on-the-Rhine, in the Kingdom of Bavaria and Empire of Germany, have invented new and useful Improvements in the Manufacture of Blue Coloring-Matter, (for which patents have been obtained in the following countries: Germany, Patent No. 61,692, dated March 20, 1891; England, Patent No. 4,543, dated March 13, 1891; France, Patent No. 212,276, dated March 23, 1891; Belgium, Patent No. 95,698, dated July 31, 1891; Italy, XXIV, 30,135, LIX, 128, dated September 30, 1891; Austria-Hungary, Patent No. 41/3,714 and No. 25/3,637, dated December 3, 1891, and Spain, Patent No. 12,328, Tome 13, fol. 439, dated August 20, 1891,) of which the following is a specification.

The ultimate object of my invention consists in a new lake that may be produced as a pigment or upon fiber. It resembles vegetable indigo in color and fastness against washing and light so nearly as to form an artificial substitute for the same such as has been sought for many years by chemists. In arriving at this new lake I have made certain very essential intermediate discoveries or inventions which I also desire to secure by this patent. Thus I have discovered and recognized that a certain class of substances— (safranine-azo-naphthol-bodies)—known as insoluble precipitates and regarded as worthless bodies, can be rendered soluble, and then constitute a most valuable dye and I have proved this discovery by rendering them soluble (as hereinafter further explained) and have hereby enriched the dyeing industry with a cheap dye of most excellent properties, the application of which is founded on transforming it into the above said lake. The said insolubility of these safranine-azo-naphthol bodies as hitherto obtained, was due to the presence of alkali and salts therein; these admixed impurities constitute a hinderance or obstacle preventing the solution of the bodies. I have further discovered that these phenolic azo-dyes (the said safranine-azo-naphthol bodies) possess the character of bases, an exceptional characteristic possessed by no phenolic azo-compound hitherto known. I have applied or used this surprising basic nature of these insoluble precipitates in two ways, viz., first, I have taken advantage thereof to produce acid compounds or salts of the safranine-azo-naphthol bodies, whereby I destroyed the influence of the impurities hereinbefore referred to, to prevent the solution of the said bodies and so obtained them in a soluble form, in a condition suitable for the use of the dyer, second, I have taken advantage of the aforementioned basic nature of the bodies, to cause them to combine, when in soluble form, with tannic acid and a metal such as antimony and iron, whereby I produced the valuable indigo-like lake.

In the year 1885 a German patent, No. 38,310, was granted to the Leipziger Anilinfabrik Beyer & Kegel for the preparation of azo-dyes by the combination of certain diazo-safranines with naphthol sulpho-acids. On account of their bad dyeing qualities these proposed dyestuffs are worthless as such, and never came into commerce and the patent was abandoned.

The compounds resulting from the combination of the safranine diazo-compounds with the unsulphonated naphthols have been mentioned in chemical literature as insoluble precipitates. They could not be applied in the dyeing industry and have since been disregarded and fallen into the rank of useless bodies and were not included in the said German patent.

I will proceed to describe the manner, in which I prefer to utilize my invention.

Under the name of safranine in this application as in literature and commerce a class of dyes is understood, which show only slight variations in chemical composition, some are mixtures of various closely related chemical substances. (See Schultz, *Chemie des Steinkohlentheers*, 2d edition, vol. 2, pages 782 to 786.) For the purpose of this invention I can use any of these bodies, known as safranine, which on treatment with nitrous acid solution yields a diazo-compound. For the sake of convenience the safranines may be distinguished as (first) "safranine proper," being such as are obtained by oxidizing materials containing none but primary amido groups and (second) "substituted safranines," by which I mean such as are obtained by oxidizing materials part of which contains secondary or tertiary amido groups.

In carrying out my invention, I can recommend the following safranines proper for use: (First.) Safranine T (obtained by the oxidation of a mixture of one molecular proportion of toluylene-diamine, one molecular proportion of ortho-toluidine, and one molecular proportion of aniline.) (Second.) Phenosafranine. And among the substituted safranines, which show bluer shades than the safranines proper, I recommend, dimethylsafranine (obtained by the oxidation of a mixture of one molecular proportion of para-amido-dimethylaniline, one molecular proportion of ortho-toluidine and one molecular proportion of para-toluidine) as a substituted safranine well suited for use in the preparation of my new dyestuff. Either alpha or beta-naphthol can be used.

The following is an example of the manner in which my invention can be carried into effect and the new dyestuff obtained. The parts are by weight.

Make a one per cent. solution of safranine, taking one molecular proportion of the safranine used: say, about seven (7) parts of safranine T, or about six and three fifths (6.6) parts of pheno-safranine, or about seven and seven tenths (7.7) parts of dimethyl safranine. Diazotize by adding first a solution of sodium nitrite containing about fourteen (14) parts of that salt, (one molecular proportion) and then twenty-three (23) parts of hydrochloric acid containing about thirty three per cent. real acid (HCl). The solution during these operations must be kept cold with ice and stirred. Next run the mixture into an ice-cold solution of about three (3) parts of naphthol—either alpha or beta—(one molecular proportion) in about one hundred and sixty (160) parts of water and twenty-five (25) parts of caustic soda solution, containing about thirty-five per cent. of sodium hydrate (NaOH), stir the mixture thoroughly for several hours, then filter off the blackish violet precipitate of safranine-azo-naphthol thus formed. Now wash well with cold water prolonging this, until the liquor running off is deeply colored and shows that a soluble product has resulted. The paste then remaining on the filter can be used in dyeing as such or after making up to a standard strength. Or without washing so thoroughly, my new dyestuff can also be prepared in the form of paste, (in which form it best meets the requirements of dyers) as follows: Stir the azo body, obtained as above described, with a little water and mix gradually with hydrochloric acid, until a test portion of the paste obtained is completely soluble in hot water.

To prepare the new dye-stuff from the quantities of safranine described in the above example, about two and one fifth (2.2) parts of hydrochloric acid, containing about thirty-three per cent. of real hydrochloric acid (HCl) may be used at this stage of the process. The paste so obtained contains my new dyestuff in the form of a salt and can be diluted or made up to a standard strength.

Instead of hydrochloric acid other acids may be used such as acetic acid, sulphuric, nitric, oxalic, and tartaric acids, also salts which act as acids; but of these hydrochloric and acetic acids give the best results.

If it be desired to prepare the new dyestuff in the dry state by the action of hydrochloric acid on the safranine-azo body obtained as above described, the latter may be suspended in about four hundred (400) parts of water, and in the cold sufficient hydrochloric acid added to reprecipitate the dyestuff, which first dissolves from the violet solution formed. About forty five (45) parts of hydrochloric acid containing about thirty per cent. real acid (HCl) will usually be necessary. Allow to cool, filter, wash, and press, and dry carefully at a low temperature.

My new dyestuff however prepared, is a soluble safranine-azo-naphthol body. It occurs in the dry form and in paste, and forms a dark colored powder with a slight metallic sheen giving a violet black paste. It is soluble in both hot and cold water giving violet to blue solutions, insoluble in alkalies, soluble in alcohol and practically insoluble or very slightly soluble in benzene. The dye can readily be recognized by its behavior on treatment with reducing agents, for safranine and amido-naphthol occur in the reduction-products.

The dyestuffs which I desire to claim generically herein may be recognized as follows: If reduced with stannous chloride and hydrochloric acid, amido-naphthol is produced and can be recognized in any suitable well known way. On careful and moderate reduction with zinc dust and acetic acid the safranine used in the production is regenerated and shows the characteristic reactions of the members of the safranine series.

The specific dyestuff obtained by the conversion of the azo-compounds from the hereinbefore mentioned safranines proper and beta naphthol into the soluble form, which I desire to claim specifically herein may be recognized as follows: It is soluble in water, it dissolves in sulphuric acid giving a blackish green solution on reduction with stannous chloride and hydrochloric acid. The amido-naphthol obtained can be recognized as being in the form known to chemists as alpha-amido-beta-naphthol and finally on careful and moderate reduction with zinc dust and acetic acid the safranine proper employed is regenerated and can be recognized.

I will now proceed to describe the new lake and the manner of obtaining it.

*Example a.*—Dissolve about twenty parts of my new dye-stuff in the form of powder (or the corresponding quantity of paste) in about two thousand parts of hot water, allow to cool and then add a solution of about thirty parts of tannin in three hundred parts of water (or the equivalent quantity of an extract of sumac), finally add a solution of about eleven grams of tarter emetic in about one hundred and fifty parts of water, raise the temperature to the boiling point and maintain this temperature for about fifteen minutes. Filter, while still hot, through a calico filter, wash well with about ten parts of cold water, press and dry the lake so obtained at a temperature of about seventy degrees centigrade.

*Example b.*—To obtain the lake on cotton fiber proceed as follows:—Take the freshly boiled out goods, pass them six times through a boiling hot solution of sumac, and then leave them over-night in the liquid. Next wring out and pass about eight or ten times through a solution of antimony salt; wash well and wring out. Now fill the dye-vat with the necessary quantity of water and add the amount of aluminium sulphate mentioned below, then enter the goods and after passing them through the liquid once or twice, remove and wring them lightly by stretching. Add about one eighth of the dye solution through a fine sieve, pass the goods again six times through the solution, then removing them and stretching as before add again one eighth of the dye solution, subsequently add a quarter of the dye solution and finally the remainder thereof manipulating in the same way. Draw the goods through the solution a few times, then raise the temperature to about forty degrees centigrade (40° C.) and subsequently to about seventy degrees centigrade (70° C.). Remove the goods from the bath and wring lightly, before raising the temperature in every case and afterward draw them several times through the bath. Raise the temperature finally to the boiling point and dye for a quarter of an hour at about this temperature, then allow the bath to cool of itself for about half an hour, moving the goods through it. Finally swill the goods with cold or luke-warm water, wring and dry. If the operations have been rightly conducted, the vat is completely exhausted.

The quantity of dye, sumac, antimony salt, &c., to be taken varies of course with the shade desired. The following quantities give good results: For full medium blue shades, take with fifty pounds of cotton goods, about four pounds of my new dyestuff in the form of paste containing about ten per cent. dry dye-stuff, about 0.7 pounds aluminium sulphate, the solution obtainable from about four to five pounds sumac leaves and about 0.7 pounds antimony salt.

In the above example the directions given are such as to enable dyers to obtain the best results under ordinary circumstances, but a large number of variations can be introduced. Thus a cheaper and sadder blue can be obtained by using iron acetate instead of antimony salt, but these cheaper shades are in some respects not so fast as those obtained with antimony salt. In dyeing, the hardest water obtainable should be used, or soft water should be hardened by the addition of a calcium sulphate solution. Lime water cannot be used for this purpose. If it be desired to obtain the fastest possible shades, the dyed and swilled goods should be boiled for about half an hour under an additional pressure of about one atmosphere and to the water used for every liter, the extract of sumac from one gram of leaves should be added. The boiler must be clean and free from rust and neither too much nor too little sumac must be added, in the first case the shades are saddened and become greener, in the second case the highest possible degree of fastness is not attained. The addition of the aluminium sulphate which can be replaced by twice the quantity of alum, is advantageous as it insures the attainment of even shades.

The new lake can also be applied to fiber directly after its preparation in free state as for instance with the aid of albumen.

In the formation of the lake the dyestuff combines chemically with the tannin and the metal, forming a new insoluble lake of most conspicuous fastness. Any acid, which is in combination with the dye, is substantially eliminated or pushed off from the dye during the formation of the lake and remains in the liquid inactive so that the lake is substantially unaffected by it. Therefore, I wish to be understood in this patent as unlimited to whether the acid element be present or absent with the dye.

The dyed goods are of a color resembling indigo, possess a degree of fastness to light and washing exceeding that obtainable with the ordinary aniline dyes and comparing advantageously with indigo itself. The coloring matter may be applied so as not to bleed into the white. In addition to the valuable and novel degree of fastness of color possessed by the lake prepared according to this invention, whether on the fiber or otherwise, it may be recognized by the following very characteristic reactions: If a portion of it be thoroughly wetted and heated with a small quantity of a dilute solution of stannous chloride (containing say about five per cent. of the chloride and fifteen per cent. of hydrochloric acid) a reddish solution is obtained and the dyed fiber (if the lake be on the fiber) also turns through violet to reddish. Without prolonging the treatment, which easily causes a further reduction, remove the fiber or other material, on which it has been fixed, from the solution. The solution contains safranine and consequently shows its well known characteristic reactions. Thus, its color is changed to violet, blue and green by the action of hydrochloric acid. If the reddish solution be completely reduced with zinc, it becomes colorless and on treating with ferric chloride, or pouring onto filter paper in the air or shaking well with the air, recovers its reddish color again.

The lake is further characterized by the following test: Soak a portion of it in sufficient strong caustic soda to cover it, warm slightly for a few minutes while stirring well, next dilute with water, pour off the solution obtained, acidify with acetic acid, filter, and add a drop of ferrous sulphate solution; a blackish coloration proves that the tannin lake is present in the fiber. Finally it is possible to determine the presence of metal by the well known tests.

Other specific dyestuffs coming within my generic claim and adapted for the formation of the lake herein generically claimed are as dyestuffs the subject of other applications, and are therefore not specifically claimed herein. These include the specific blue dyestuff which can be derived by making soluble the azo compound from safranine proper and alphanaphthol, such forming the subject matter of a separate application, Serial No. 430,111; also the specific dyestuff which can be derived by making soluble the azo compound from dimethyl safranine and beta-naphthol which forms the subject matter of a separate application filed by me, Serial No. 430,112; also, the specific blue dyestuff which can be derived by making soluble the azo compound from dimethyl safranine and alphanaphthol which forms the subject matter of a separate application filed by me, Serial No. 430,113.

What I claim as new, and desire to secure by Letters Patent, is—

1. As an article of manufacture a coloring-matter lake resembling indigo in color, which can be obtained by combining a soluble safranine azo naphthol body with a tanno-metallic mordant and which is very fast to light and washing; upon suitable reduction it shows the reactions of safranine, upon treatment with caustic soda it shows the reactions of tannin and it contains a metal, substantially as described.

2. As an article of manufacture, the herein described blue dyestuff which can be obtained from a safranine azo naphthol and which may be recognized by the following characteristics: It is soluble in water, upon reduction with stannous chloride and hydrochloric acid, amidonaphthol is produced and upon reduction with zinc dust and acetic acid a safranine is produced, substantially as described.

3. The process which consists in the treatment of a safranine-azo-naphthol with an acid until the body is rendered soluble in water, substantially as described.

4. The specific blue coloring matter (obtainable by rendering the safranine-azo-beta-naphthol hereinbefore mentioned soluble in water) which possesses the following characteristics: It is soluble in water, gives a blackish green solution in sulphuric acid and on reduction gives alpha-amido-beta-naphthol and safranine proper, all substantially as described.

In testimony whereof I have hereunto set my hand in the presence of two subscribing witnesses.

PAUL JULIUS.

Witnesses:
ERNEST F. EHRHARDT,
ADOLPH REUTLINGER.